United States Patent [19]
Hagin et al.

[11] Patent Number: 4,647,084
[45] Date of Patent: Mar. 3, 1987

[54] PIPE CONNECTION

[75] Inventors: Faust Hagin, Munich; Stefan Martini, Ulm; Hans J. Drewitz, Munich, all of Fed. Rep. of Germany

[73] Assignee: M.A.N. Maschinenfabrik Augsburg-Nurnberg AG, Munich, Fed. Rep. of Germany

[21] Appl. No.: 838,916

[22] Filed: Mar. 12, 1986

[30] Foreign Application Priority Data

Mar. 12, 1985 [DE] Fed. Rep. of Germany ....... 3508732

[51] Int. Cl.$^4$ ............................................. F16L 25/00
[52] U.S. Cl. ................................. 285/332.1; 285/184; 285/271; 285/334.1; 285/363
[58] Field of Search .................. 285/334.1, 332.1, 266, 285/271, 261, 911, 184, 363

[56] References Cited

U.S. PATENT DOCUMENTS 3,233,921 2/1966 Holmgren et al. .......... 285/332.1 X
3,332,709 7/1967 Kowalski ..................... 285/332.1 X
3,361,450 1/1968 Franck ................................. 285/271

FOREIGN PATENT DOCUMENTS 752105 7/1980 U.S.S.R. .............................. 285/261

Primary Examiner—Dave W. Arola
Attorney, Agent, or Firm—Alan H. Levine

[57] ABSTRACT

The invention relates to a fluid tight pipe connection having an intermediate ring between the two pipe ends. By making the two surfaces of the ring complementary to the pipe end faces the ring may be displaced in relation to one pipe end and may be moved pivotally in relation to the other pipe end to enable the connection to allow for angular misalignment and parallel offset of the pipe axes while still maintaining a sealing joint.

6 Claims, 6 Drawing Figures

PIPE CONNECTION

BACKGROUND OF THE INVENTION

The invention relates to fluid-tight pipe connections in which the ends of two pipes are clamped together and have facing joint faces around their respective bore orifices so as to extend perpendicularly to the said bore, there being at least one gasket ring surrounding the two orifices of the bores between the two joint surfaces.

The commonest type of pipe connection would appear to be a flange connection in which two mutually opposite ends of the pipes each have a flange whose face turned towards the other pipe is the joint face. The two flanges are clamped together by screws for example to hold a gasket between the joint faces.

However, conditions are often such that alignment of the two pipe ends is only possible using involved manufacturing operations. Although relatively thin or loosely supported pipes may as a rule be bent to such an extent that they are brought into alignment, in the case of short, squat or even block-like pipe terminations this is not possible.

Particular problems are likely in the case of pipe connections with an arcuate elbow pipe section intended to produce two joints at an angle to each other in automotive hydraulic circuitry, since in such a case space is at a premium and the joints have to withstand high pressures. Furthermore, the pipe connection is exposed to vibrations and the large tolerances allowed in automotive applications may not be reduced. For the connection together of such components at an angle to each other the possibility of using flexible hose is limited for it may not be sharply bent, is not available in large diameters with a high pressure resistance and furthermore owing to aggressive ambient conditions where the hose is used it has a short service life.

It is furthermore possible to employ a nipple or short length of pipe with two ball joints. The two ends of such a nipple (i.e. short length of pipe) may be aligned in relation to the opposite ends of the pipe so that a connection is produced between two connections requiring only a very short radius of bending. Such a connecting nipple is however complicated to produce, obstructs flow through the connection and tends to lead to leaks owing to the large number of joint surfaces.

SHORT SUMMARY OF THE INVENTION

In view of these shortcomings of the prior art, one object of the present invention is to further improve a pipe connection of the initially specified sort so that it provides a simple way of connecting pipes that are at an angle to each other and/or are axially offset, to produce a pressure tight joint therebetween.

In order to achieve this or other objects of the invention that will appear in the course of the ensuing specification, the first joint surface is in the form of a flat surface and the second joint surface is in the form of the face defined between two parallel circles of different diameter on the face of a sphere, surrounding the respective bore orifice, while there is an intermediate ring clamped between the two joint surfaces, which in order to be complementary to the joint surfaces possesses a part-spherical face as defined by two parallel circles of different diameter on a sphere, and a plane surface as engagement surfaces.

To put it differently, it may be said that in the pipe connection of the invention the intermediate ring has two opposite joint surfaces of which the one is flat and the other is a convex or concave part-spherical face bordered by two parallel circles of different diameter.

The joint surface adjoining each engagement face, of the respective pipe ends is complementary to the adjacent engagement surface so that one may say that it is the one joint surface adjoining the flat engagement surface, whereas the other joint surface is of such a spherical form that it is seated on the engagement surface therefor. Owing to the presence of the two spherical joint surfaces in engagement the intermediate ring may be swung at an angle in relation to the adjacent, spherically formed joint face without disturbing the snug engagement between the two complementary surfaces. It is furthermore possible for the flat engagement surface to be displaced in relation to the flat joint surface transversely in relation to the axial direction of the pipe connection without disturbing the snug and tight engagement between these two complementary surfaces. The intermediate ring and the joint faces made complementary thereto therefore make possible an engagement between pipes even if there is axial or angular misalignment.

The problems initially touched upon, and more especially those that occur in connection with joints at an angle to each other in automotive hydraulic equipment, may thus be overcome by a simple elbow with tight tolerances or a block having a curved duct therein, and which at one of its orifices at least forms a pipe connection in accordance with the invention with the respective hydraulic connection. This elbow fitting or elbow block may be simple and permanently clamped to the hydraulic device, such as a hydraulic transmission of a vehicle. The present invention therefore relates not only to the said pipe connection, but furthermore to an automotive hydraulic device with two entry orifices placed at an angle to each other and which are connected together by means of an elbow fitting or the like, and lastly to such an elbow fitting or nipple as such.

In accordance with further developments of the invention the spherical surface of the intermediate ring is either concave or convex. Each of these two possible forms has advantages for certain purposes; if the intermediate ring has a convex engagement surface, the internal pressure tending to move it outwards will press it into snug engagement with the complementary, concave joint surface of the one pipe end. Consequently, this design gives an enhanced sealing effect in applications involving very high pressures. It is furthermore possible, and in some cases advantageous as well, to produce the intermediate ring itself of a ductile or flexible material producing a gasket effect, as for example one made of copper. The clamping together of the two pipe ends cause the engagement faces of this ring to be pressed firmly against the complementary joint surfaces of the pipe ends, the internal pressure occurring within the pipe connection ensuring an improved sealing action.

If the intermediate ring is concave in form, then it becomes possible to allow for substantially larger misalignment angles between the two pipe ends while only having a small overall height.

In accordance with a further development of the invention the intermediate ring does not have sealing properties like a soft material and there is an additional sealing or gasket means in the form of at least one gasket ring. It is an advantage if this ring gasket engages the two opposite joint surfaces of the pipe ends, it being preferably arranged in the diameter of the intermediate ring. In the last-named case the use of a highly ductile material for the gasket ring is an advantage which is forced by the internal pressure into the gaps between the intermediate ring and the joint surfaces.

In the event of the other design features not allowing the use of such a gasket ring it is however possible to produce at least one annular groove and more especially two annular groves in each of the engagement surfaces of the gasket ring and to place one gasket ring in each such annular groove so as to make sealing contact with the adjacent joint surface.

The two pipe ends may for example be clamped together by the use of clamping elements which are articulatingly joined with the two pipe ends. It is furthermore possible to have through holes in one of the pipe ends right at the start, to then place the two pipe ends together and produce cooperating holes, exactly aligned with the through holes, in the other pipe end so that such cooperating holes may then be screw threaded. This makes it possible to screw the two pipe ends together with simple connecting screws reliably, even in the event of the pipe ends being at a considerable angle to each other.

Finally it is also possible to clamp the two pipe ends together with comparatively long clamping screws if there is only a slight misalignment, so that the screws bend the pipe ends in the desired direction on being tightened.

However in the case of pipe ends which are misaligned to a considerable degree not only in angle but furthermore by virtue of there being an axial offset, it is possible for the ends to be clamped together in a particularly simple way forming a further feature of the invention if there is a set of threaded holes in one pipe end around the intermediate ring so as to be substantially parallel to the axis of the pipe end and are sufficiently spaced from the intermediate ring in order to allow it to be displaced as required in a direction transverse in relation to the axis of the pipe end, if it is a question of that pipe end bearing a flat joint surface.

In accordance with this preferred form of the invention the other pipe end is designed in the form of a flange and has through holes for the attachment screws screwed into the threaded holes, the through holes having a large enough a diameter to allow displacement of the two pipe ends in a direction perpendicularly to their aches.

Between the rear side of the flange and the heads of attachment screws there are hemi-spherical washers whose inner diameters are larger than the shanks of the attachment screws.

This makes it possible for the flat sides of the washers to be applied to the rear side of the flange. The head of each attachment screw is then supported on the spherical side so as to make line contact so that there is a geometrically perfect engagement between the two pipe ends for every relative position thereof.

In accordance with a further and more especially advantageous feature of the invention the through hole in the flange is counterbored on the rear flange side so as to produce a spherical or more particularly conical form so that the hemi-spherical washer has its spherical surface seated in the counterbore. Then the screw head is rested snugly on the flat surface of the washer. Such an arrangement assures a large force transmission area and is able to withstand substantial forces which are needed to press the ends of high pressure pipes together.

The invention will now be explained by way of example on the basis of the attached diagrammatic drawings.

LIST OF THE SEVERAL VIEWS OF THE DRAWINGS

DETAILED ACCOUNT OF WORKING EXAMPLES OF THE INVENTION

Figure 1:
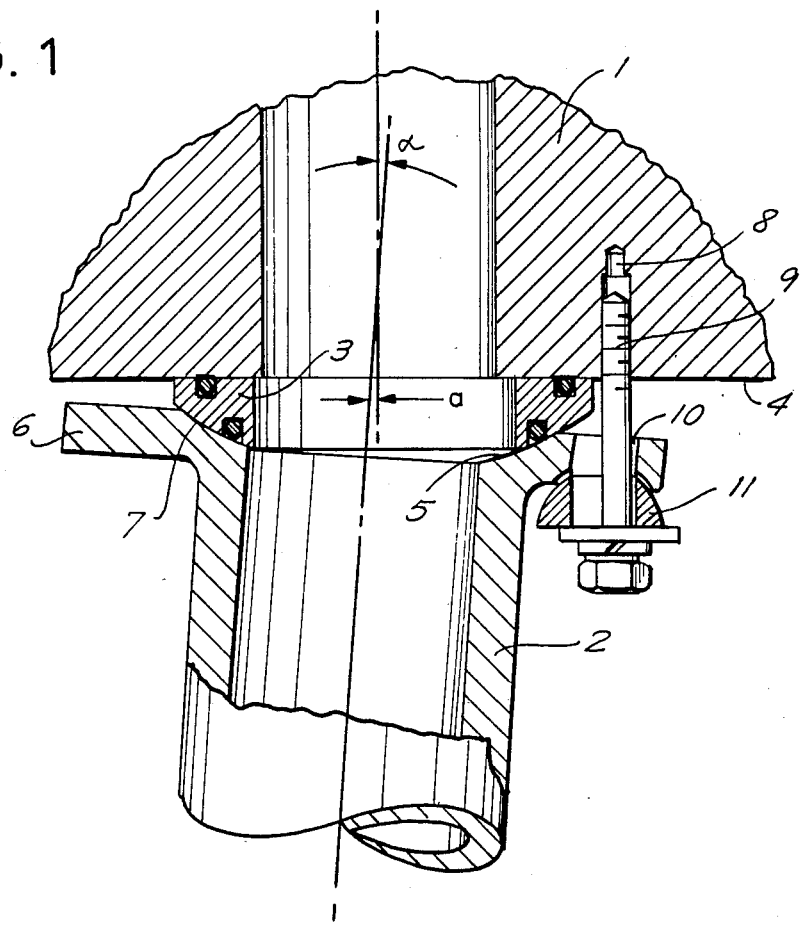
FIG. 1 is an axial section through a pipe connection in accordance with the invention with the structure for clamping the pipe ends against each other.

FIG. 1 is a longitudinal section through a pipe connection in accordance with the invention in which a first pipe end 1 and a second pipe end 2 are located in relation to each othe with a intermediate ring 3 therebetween to provide a geometrically perfect joint even though there is an angular misalignment $\alpha$ between the two pipe ends 1 and 2 and also an axial offset of a.

The two pipe ends 1 and 2 each have a bore or duct, such ducts having approximately the same diameter.

The first pipe end 1 has a flat joint surface 4 forming a radial plane in relation to the axis of the bore of the pipe end 1.

The intermediate ring 3 whose inner diameter is larger than that of the two pipe ends 1 and 2 has a flat engagement face aligned in a radial plane in relation to the center axis thereof. The flat engagement surface of the intermediate ring 3 is snugly seated on the flat joint surface 4.

The second pipe end 2 has a radial flange 6 whose end face is substantially in a radial plane in relation to the center axis of the bore of the pipe end 2. This end surface is countersunk to have a spherical depression with a surface 5 which for its part has the same geometrical form as the outer face of a spherical section. The radius of this spherical section is made of such a size that the likely angular misalignment of the pipe ends may just be allowed for. However, the radius should not be so large that the intermediate ring 3 is not entrained on lateral displacement of the pipe end 2 for adjustment purposes.

On its side facing the concave spherical surface 5 of the pipe end 2 the intermediate ring 3 has a complementary convex spherical surface 7 that is in engagement with the pipe end. In this respect the height of the intermediate ring 3 is so selected that the likely misalignment errors to be expected may be accommodated without the two pipe ends 1 and 2 abutting each other.

There are threaded holes 8 in the pipe end 1 parallel to its axis so that they surround the bore of the pipe with an even spacing between them such that the largest transverse misalignment of the intermediate ring 3 is allowed for by the screws or bolts 9 in the threaded holes 8.

The flange 6 has through holes 10 in it which are complementary to the threaded holes 8 in the other pipe end and such holes 10, have a diameter that is so large that the flange 6 may be displaced by the maximum axial amount a, i.e. without such displacement being hampered by the attachment screws 9 extending through the holes 10.

On the side of the flange 6 facing away from the first pipe end 1 the holes 10 are conically countersunk to receive semi-spherical washers 11 so that the semi-spherical surfaces thereof engage the inner surfaces of the countersinks. The washers have internal diameters that are slightly larger than that of the holes 10. However, as a further possibility to achieve a snug fit of the semi-spherical washers 11 in the countersunk depressions continuing the holes 10 it is possible to design the holes 10 with a larger diameter than that of the hole in the semi-spherical washer 11. The maximum axial displacement a between the two pipe ends 1 and 2 is then limited if the bore face in the semi-spherical washer 11 contacts the shank of the attachment screw 9.

Between the head 12 of the attachment screw 9 and the flat face of the semi-spherical washer 11 facing the head there is a spring washer and a flat waster. The washer 11 assumes such an angular setting in relation to the bore 10 in the flange 6 that one may be certain of a snug mutual engagement between the screw head 12, the spring ring, the flat washer and the flat surface of the semi-spherical washer 11.

In the flat and semi-spherical engagement faces of the intermediate ring annular grooves are produced that are concentric to the center axis of the ring and which receive respective gasket rings to produce a seal between the floor of each such groove and the opposite joint face 4 and 5. In this respect the positions of the annular grooves are so selected that even on the occurrence of maximum misalignment the respective gasket rings will still engage the opposite joint surface.

In order to make the drawings generally more straightforward, the screw means between the two pipe ends as shown in FIG. 1 is omitted in the following figures.

Figure 2:
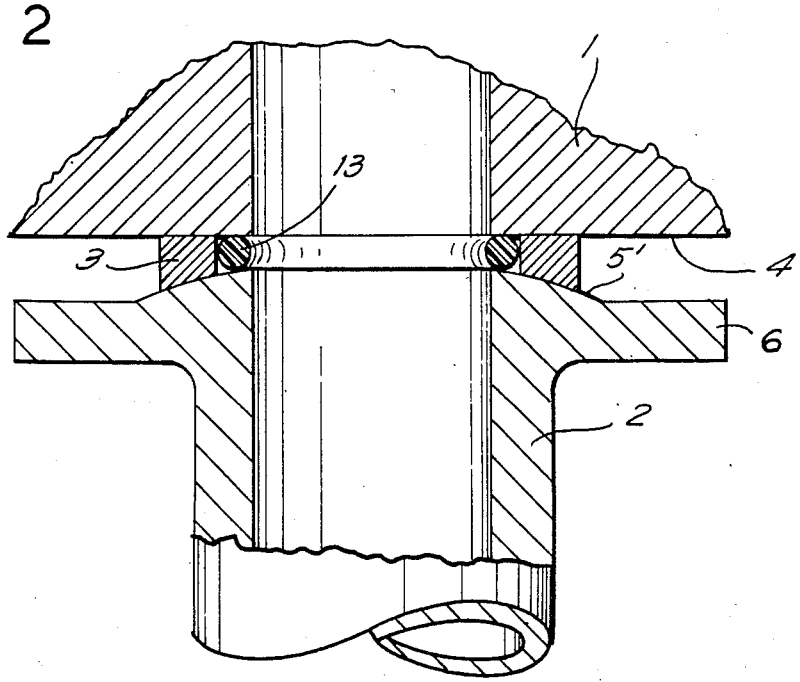
FIGS. 2 and 3 are respective diagrammatic views of further working examples of pipe connection in accordance with the invention.

FIG. 2 shows a further working embodiment of the pipe connection of the invention: in this case the pipe end 1, as in the working example of FIG. 1, is furnished with a flat joint surface 4, whereas the pipe end 2 has a convex joint surface 5' to which the respective concave engagement surface of the intermediate ring 3 is made complementary. This arrangement makes it possible to keep to a very small distance between the pipe bores of the two pipe ends 1 and 2 so that the compressive forces acting in a radial direction are comparatively low.

If the intermediate ring 3 is made with a sufficiently large diameter the result will be a narrow and deep annular gap between the two pipe ends 1 and 2 in order t/o receive a gasket ring 13.

The internal diameter of the intermediate ring 3 and therefore of the gasket ring 13 as well are further dependent on the maximum angular misalignment α (see FIG. 1) to be expected, care having to be taken to see that the gasket ring 13 is always kept clamped between the two joint surfaces 4 and 5'. A further point is that the geometry of the intermediate ring 3 as seen in FIG. 2 will accommodate for substantially larger angular misalignment, insofar as the distance between the flange 6 and the opposite pipe end 1 itself may be relatively large in size if the intermediate ring 3 is comparatively flat.

Figure 3:
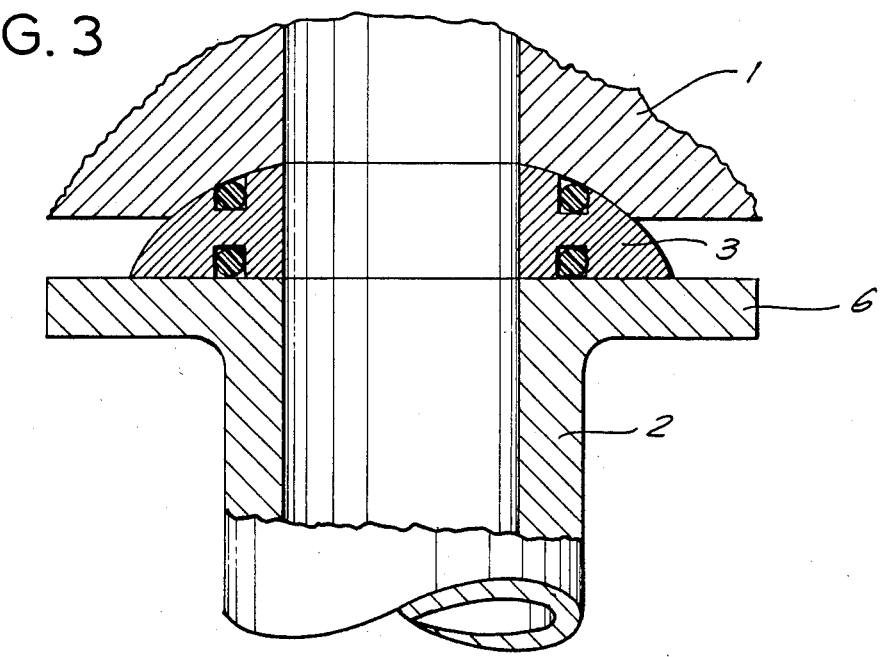

FIG. 3 illustrates a further embodiment of the invention which resembles that of FIG. 1 with the difference however that the concave, part-spherical joint surface is formed in the pipe end 1, whereas the radial surface of the flange 6 of the pipe end 2 acts as a flat surface.

If one assumes that the pipe end 1 is constituted by the housing block of an item of automotive hydraulic equipment, it is then possible to machine the concave part-spherical surface in the end of the pipe end 1 as one step in the manufacture of the housing block which in any case has to take place with a high degree of accuracy and suitable production equipment.

In this case the pipe end 2 forms part of an elbow fitting that is preferably in the form of a simple casting. In this case it will be sufficient to grind the end of the flange 6, alignment with the axis of the bore of the pipe end 2 not being critical since angular misalignment between the actual position of the said end face and an ideal radial face will be allowed for by the intermediate ring 3. Accordingly, the embodiment of FIG. 3 is particularly simple to manufacture.

If the amount of space makes it possible, it is an advantage in the case of FIG. 2 as well if the inner diameter of the intermediate ring 3 is made larger than that of the adjacent pipe bores in order to ensure that on allowing for angular misalignment one edge of the intermediate ring 3 protrude into the flow cross section of the pipe end 1.

The gasket arrangement of the embodiment to be seen in FIG. 3 is the same as that of FIG. 1.

Figure 4:
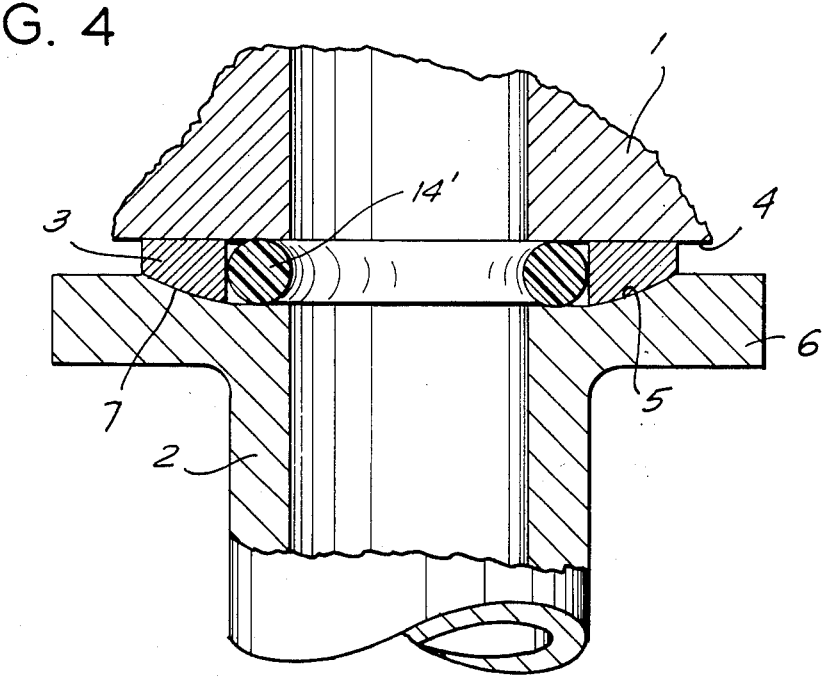
FIGS. 4 to 6 are respective diagrammatic radial sections of preferred gasket arrangements for the pipe connection of the present invention.
Figure 5:
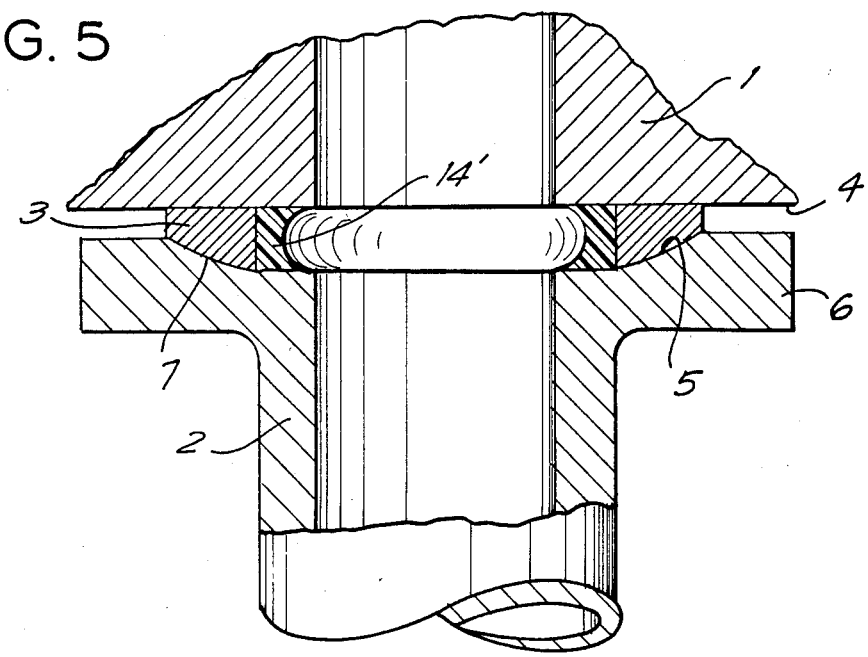
Figure 6:
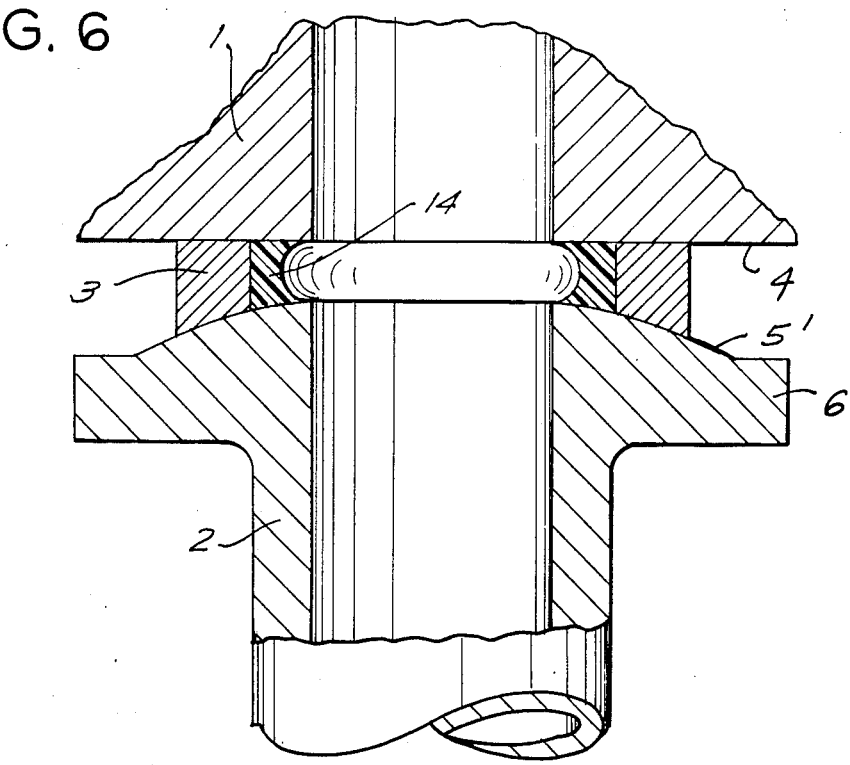

FIGS. 4 through 6 show different gasket or seal arrangements.

If the joint surface of one of the two pipe ends 1 and 2 is made convex, as is the case with the joint surface 5' of the embodiment of FIG. 2, then although manufacture of the respective pipe end is relatively complex, the result, which may be an advantage, is that there is only a very narrow annular gap to be sealed off between the two pipe ends 1 and 2 and this annular gap may be taken care of by a relatively stiff sealing ring 13 as is shown in FIG. 2 or by a sealing inlay 14 of comparatively ductile and soft material as is shown in FIG. 6.

If it is not bonded to one of the joint surfaces, the comparatively stiff gasket ring 13 makes it possible to disassemble and rejoin the pipe connection without replacing the gasket ring 13, whereas the sealing inlay 14 will probably become so firmly bonded to the joint surfaces that before remaking the pipe connection it will be necessary to clean the joint surfaces and to use a new sealing inlay 14. On the other hand owing to its ability to flow the sealing inlay 14 is capable of reliably filling an annular seal gap even if such a gap sharply changes in breadth as for example is the case if in the embodiment of FIG. 6 the two pipe ends 1 and 2 are heavily offset in FIG. 6 in a direction that is transverse in relation to the axial direction (see the dimension a in FIG. 1).

FIG. 4 shows a gasket ring 13' similar to the gasket ring 13 but with a form of the intermediate ring as is shown in FIG. 1. In this case the gasket ring 13' has to have a comparatively large thickness as seen in the axial direction. In FIG. 5 the reader will be able to see an intermediate ring 3 similar to that of FIGS. 1, 3 and 4, together with a flowable sealing insert 14' placed within the bore. and which resembles the sealing inlay 14 of the arrangement of FIG. 6 while having a greater axial thickness. A particular advantage of the embodiment of FIG. 5 is to be seen in the fact that on using the sealing inlay 14 the formation of eddies in the hydraulic flow through the pipe is reduced to be less that in the arrangement of FIG. 4.

We claim:
1. A pipe connection comprising:
a first pipe end having an orifice surrounded by a flat surface, a second pipe end having an orifice surrounded by a flange, the flange having a part-spherical surface facing the flat surface of the first pipe, an intermediate ring between the surfaces of the first and second pipe ends, the ring having a flat surface engaging the flat surface of the first pipe end and a part-spherical surface engaging the part spherical surface of the second pipe end, and means for fastening the pipe ends together with the intermediate ring between them, said means including:

a threaded bore in the flat surface of the first pipe end, a hole in the flange aligned with the bore, a bolt extending through the hole and threaded into the bore, the diameter of the hole being considerably larger than the diameter of the bolt, and a washer surrounding the bolt on the side of the flange opposite the side which faces the first pipe end, the washer having a part-spherical surface engaging the flange, and the washer having a hole through which the bolt passes, the diameter of the washer hole being considerably larger than the diameter of the bolt, the cooperating part-spherical surfaces of the flange and intermediate ring permitting the pipe ends to be joined even though their axes are at an angle to each other, and the large diameters of the holes in the flange and washer as compared to the diameter of the bolt permitting the pipe ends to be joined even though their axes are laterally offset from each other.

2. A pipe connection as defined in claim 1 including a depression in the flange surrounding the hole in the flange, the depression being engaged by the part-spherical surface of the washer.

3. A pipe connection as defined in claim 1 wheren the part-spherical surface of the flange is convex.

4. A pipe connection as defined in claim 1 wherein the part-spherical surface of the flange is concave.

5. A pipe connection as defined in claim 1 including a gasket within the intermediate ring and engaging the surfaces of both pipe ends.

6. A pipe connection as defined in claim 1 wherein each of said surface of the intermediate ring has an annular groove, and including a gasket in each groove, each gasket engaging the pipe end surface which it faces.

* * * * *